March 19, 1968    G. HOLLAND ET AL    3,374,454
MEASURING TAPE FOR STRAIN GAUGE
Filed Oct. 28, 1966
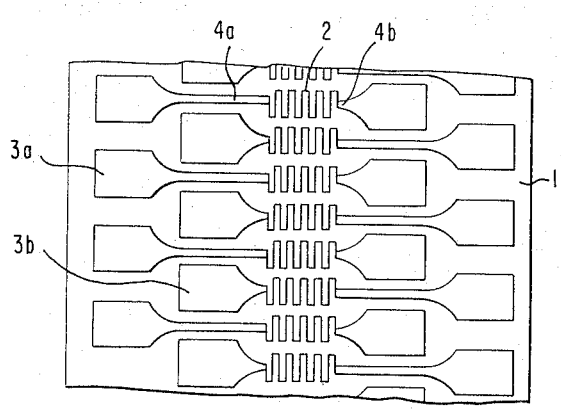
INVENTORS
GERHARD HOLLAND
GERMAN KIENLE
BY *Dicke + Craig*
ATTORNEY United States Patent Office 3,374,454
Patented Mar. 19, 1968

3,374,454
MEASURING TAPE FOR STRAIN GAUGE
Gerhard Holland, Stuttgart-Riedenberg, and German Kienle, Stuttgart-Unterturkheim, Germany, assignors to Daimler-Benz Aktiengesellschaft, Stuttgart-Unterturkheim, Germany
Filed Oct. 28, 1966, Ser. No. 590,337
Claims priority, application Germany, Oct. 28, 1965, D 48,537
10 Claims. (Cl. 338—2)

ABSTRACT OF THE DISCLOSURE

A compact strain gauge measuring tape is described which makes possible the placement of individual strain measuring resistive elements more closely adjacent to one another along the length of a backing tape without having to reduce the rather large connecting surfaces required for a completely satisfactory electrical connection to each of the individual strain sensive resistive elements. This closely spaced parallel arrangement of measuring resistance elements is the result of an arrangement of long and short connecting web portions between each resistive element and its lamellae-like, large surface contact soldering tabs formed on each end of the resistive elements. By this arrangement the individual strain sensing resistive elements can be arrayed parallel to each other along the longitudinal axis of a backing tape in a manner such that the shorter connecting web portions are located and nest between the longer web portions. The arrangement assures the greatest possible number of securely connected measuring elements arrayed within a unit length of the tape so as to allow for a maximum number of reliable measuring points over the surface of a work piece to which a section of the measuring tape is applied.

The present invention relates to a measuring tape for strain gauges, and more particularly to an improvement and further development of strain gauge measuring tapes as described in the co-pending application Ser. No. 426,595, now Patent No. 3,327,271, dated June 20, 1967, filed in the U.S. Patent Office on Jan. 19, 1965, and assigned to the assignee of the present application. The aforementioned co-pending application and its contents are incorporated herein by reference to the extent necessary.

The present invention essentially consists in the arrangement of soldering connections of different length of the electrical measuring resistances in such a manner that in each case a longer soldering connection comes to lie between two shorter soldering connections. The measuring resistances and soldering connection lamellae are identical among themselves and only the connecting webs disposed therebetween are of different length, whereby at each measuring resistance a long connecting web is provided at one end and a short connecting web at the other.

The present invention makes it possible to place the measuring resistances more closely adjacent one another without having to reduce the large connecting surfaces necessary for a completely satisfactory soldered connection. The more close series arrangement of the measuring resistances one behind the other offers the advantage of a larger number of measuring places over a given measuring length. Furthermore, as a result of the arrangement of a long and a short connecting web each at the individual measuring resistances, the electrical resistance for all measuring tapes remains completely constant and the same for all. Furthermore, as a result thereof, all tape surfaces or covers remain exactly identical.

Accordingly, it is an object of the present invention to provide an electrical measuring tape for strain gauges which obviates by simple means the aforementioned shortcomings and drawbacks encountered in the prior art constructions.

Another object of the present invention resides in a strain gauge measuring tape in which the individual measuring resistances can be placed more closely adjacent to one another, thereby resulting in a more compact arrangement without impairing the completely satisfactory soldering connections.

A further object of the present invention resides in a measuring tape for strain gauges which assures a greater number of measuring places per unit length than realizable heretofore.

Still another object of the present invention resides in a measuring tape for strain gauges in which the individual measuring resistances are of identical configuration, thus not only enabling an economic mass production, but also an assembly in which the surface areas of the individual measuring resistances are identical.

Another object of the present invention resides in measuring tapes for strain gauges of the type described above which not only achieves all of the aforementioned aims and objects by extremely simple and effective means but which also offers the great advantage of complete uniformity of the individual measuring resistances as to the ohmic resistance thereof.

These and further objects, features, and advantages of the present invention will become more obvious from the following description when taken in connection with the accompanying drawing which shows, for purposes of illustration only, one embodiment in accordance with the present invention, and wherein:

The single figure is a plan view on one embodiment of a portion of a measuring tape provided with a series of measuring resistances in accordance with the present invention.

Referring now to the single figure of the drawing, reference numeral 1 designates therein the strain gauge measuring tape made of any suitable known material while reference numeral 2 designates therein the individual measuring resistance elements which may consist of conventional material and configuration. Each of the measuring resistance elements 2 is provided on each side thereof with a soldered connection 3a and 3b. Such measuring chains, broadly speaking, are known per se in the art and form no part of the present invention.

On the other hand, the present invention essentially consists in that the connecting places 4a and 4b between the soldered connection lamellae 3a and 3b and the measuring resistance element 2 are of different length; and more particularly, the arrangement according to the present invention is made in such a manner that the lamellae 3a and 3b are arranged offset in the direction of the tape width in such a manner that a longer soldering connection 3a, 4a, comes to lie between two shorter soldering connections 3b and 4b. Furthermore, each measuring resistance element according to the present invention is provided with a short and a long soldering connection 4b and 4a, respectively, thereby enabling the compact assembly as illustrated.

The strain gauge measuring tape according to the present invention is used in a manner, known per se, and as more fully described in the aforementioned co-pending application. Additionally, the strain gauge of the present invention may also be provided with additional markings as disclosed more fully in said co-pending application.

While we have shown and described one embodiment in accordance with the present invention, it is understood that the same is not limited thereto but is susceptible to numerous changes and modifications as known to a person

We claim:

1. A compact strain-gauge measuring tape, comprising a backing tape having a plurality of individual measuring resistance means secured thereto and arranged closely adjacent and parallel to one another, soldering connection means on each end of each of said individual resistance means, the soldering connection means on each individual resistance means being of different length, the plurality of individual resistance means being arranged to extend along the longitudinal axis of the tape in a manner such that alternate shorter soldering connection means are located and nest between alternate longer soldering connection means.

2. A measuring tape according to claim 1, wherein said resistance means are disposed substantially in alignment in the longitudinal direction of the tape, the soldering connection means being connected to respective resistance means on each side of the tape in such a manner that on each side of the tape the alternate longer soldering connection means are in longitudinal alignment and the alternate shorter soldering connection means are in longitudinal alignment.

3. A measuring tape according to claim 2, wherein each soldering connection means includes a lamellae-like portion of relatively large surface connected with the resistance means by way of a web portion of relatively smaller surface, the lengths of said web portions being different.

4. A measuring tape according to claim 3, wherein the lamellae-like portions are all of substantially identical configuration and surface area.

5. A measuring tape according to claim 4, wherein each of said resistance means comprises a highly resistive meandering conductive path.

6. A compact strain-gauge measuring tape, comprising a longitudinally extending backing tape having a plurality of measuring resistance means secured thereto and arranged adjacent and parallel to one another, two soldering connection means for each resistance means, the two soldering connection means to respective ends of a respective resistance means and being of different length, said soldering connection means being so arranged along the longitudinal axis of the tape that a longer soldering connection means is located between two shorter soldering connection means.

7. A measuring tape according to claim 6, wherein alternate resistance means are disposed substantially in alignment in the longitudinal direction of the tape, the soldering connection means being connected to the lateral end portions of respective resistance means in such a manner that on each side of the backing tape a shorter soldering connection means of a respective resistance means is followed by a longer soldering connection means of an adjacent resistance means and, in turn, is followed by a shorter connection means and so on.

8. A measuring tape according to claim 6, wherein each soldering connection means includes a lamellae-like portion of relatively large surface connected with the resistance means by way of a web portion of relatively smaller surface, the lengths of the web portions connected to a respective resistance means being of different length.

9. A measuring tape according to claim 8, wherein the lamellae-like portions are all of substantially identical configuration and surface area, and the lamellae-like portions connected to the shorter web portions of alternate resistance means are located and nest between the alternate longer web portions of adjacent resistance means with the lamellae-like portions connected to the alternate longer web portions being in longitudinal alignment along each edge of the backing tape.

10. A measuring tape according to claim 9, wherein each individual resistance means comprises a highly resistive meandering conductive path.

References Cited
UNITED STATES PATENTS

| | | | |
|---|---|---|---|
| 2,457,616 | 12/1948 | Van Dyke et al. | 338—2 |
| 2,913,691 | 11/1959 | Hines | 338—3 |
| 3,064,221 | 11/1962 | King | 338—2 |
| 3,134,953 | 5/1964 | Eisler | 338—2 |
| 3,274,528 | 9/1966 | Bermann | 338—2 |
| 3,303,450 | 2/1967 | Brackett et al. | 338—2 |

RICHARD M. WOOD, *Primary Examiner.*

W. D. BROOKS, *Assistant Examiner.*